April 21, 1953  F. W. DREYFUS  2,635,859
MIXER APPARATUS
Filed June 12, 1950

FELIX W. DREYFUS
INVENTOR.

BY

ATTORNEY

Patented Apr. 21, 1953

2,635,859

UNITED STATES PATENT OFFICE 2,635,859

MIXER APPARATUS

Felix W. Dreyfus, New Orleans, La.

Application June 12, 1950, Serial No. 167,613

6 Claims. (Cl. 259—10)

The present invention relates generally to mixing apparatus, and is more particularly concerned with improved means for mixing of materials, especially dry and buoyant materials, with a fluid.

While the invention is essentially useful for the mixing of mud and a liquid for utilization in the drilling of oil wells, it is susceptible of general use in chemical, paint, foods, cosmetic and other industries, where mixers are utilized.

The invention has for one of its objects the provision of improved mixing means of simple, efficient construction, which may be utilized for the introducing of materials into a fluid or liquid in such manner that the material is immediately carried into and mixed into the solution; and the possibility of the material floating on the surface of the fluid or liquid, particularly in the case of material in a substantially dry and buoyant state, is eliminated.

As a further object, the invention contemplates apparatus for the mixing of materials with a liquid in a tank or container, such apparatus being driven and operated by the same power means as may be utilized for the circulation and distribution of the liquid mixture in the tank.

Still another object is to provide a tank or container mixer attachment which may be mounted in a mixing tank or container for introducing and mixing materials with a liquid, in such manner that the mixing will be accomplished in an efficient and economical manner, with substantially little or no possibility of any of the materials floating to the surface of the liquid.

Further objects of the invention will be brought out in the following part of the specification wherein detailed description is for the purpose of fully disclosing the invention without placing limitations thereon.

Figure 1:
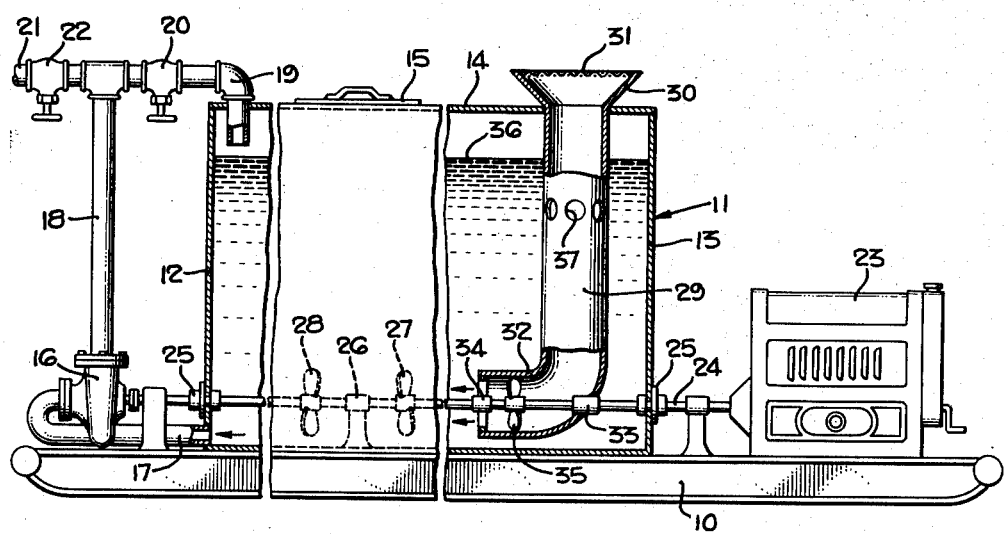
Figure 2:
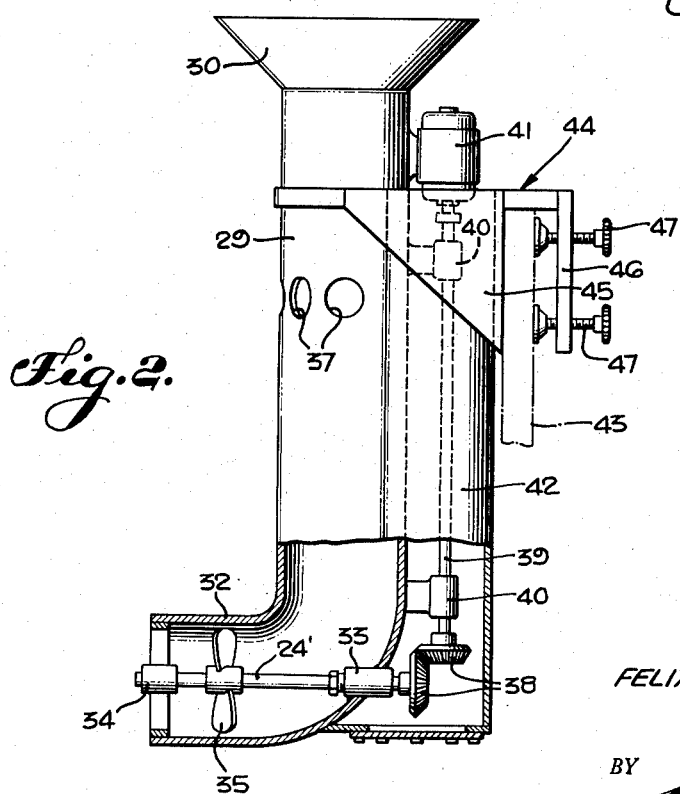

Referring to the accompanying drawings, which are for illustrative purposes only:

Fig. 1 is a mud mixer, such as utilized in the oil industry, which incorporates the features of the present invention; and Fig. 2 is an elevational view of mixer apparatus constructed as a unit assembly for attachment to a tank or container, parts thereof being cut away and shown in sections to disclose structural details.

Referring specifically to Fig. 1 of the drawings, the invention is disclosed as being embodied in mud mixing apparatus such as utilized in the oil industry in connection with the drilling of oil wells. The apparatus is mounted on skid rails 10 which also form a base structure for various parts of the equipment.

A tank, as generally indicated by numeral 11, is supported on the skid rails, this tank having end walls 12 and 13 and a closing top wall 14 which may contain an access opening normally covered by a closure 15.

At one end of the tank 11, exteriorly thereof, there is mounted a pump 16 having an inlet connected through a conduit 17 with the tank interior adjacent its bottom. The outlet of pump 16 is carried through a conduit 18 upwardly to the top of the tank where it is connected to a branch 19 for flow back into the top of the tank, flow through this branch being controlled by a suitable valve 20.

The conduit 18 also connects with a branch connection 21 which forms a discharge connection for carrying the tank mixture to a desired point of distribution, the branch 21 being under control of a valve 22. It will be apparent that, by properly manipulating valves 20 and 22, the discharge from the pump 16 may be recirculated through the tank or distributed to a remote point as desired, or proportioned between the branches 19 and 21.

For actuating the pump 16, suitable power means, in this instance an internal combustion engine 23, is mounted on the rails 10 at the opposite end of the tank 11, a driving shaft 24 being operatively connected to the pump 16. The driving shaft 24 is carried through suitable packing glands 25—25 in the tank walls 12 and 13. If desired, the shaft 24 may be supported within the tank interior upon suitable pedestal bearings as shown at 26 in dotted lines.

Heretofore, materials have simply been introduced into the liquid within the tank, and by means of oppositely acting impellers 27 and 28, alternately arranged on the shaft 24, the material has been mixed with the tank liquid. Where these materials have been such as to have a tendency to float on the liquid surface, the materials were not readily carried into and mixed with the liquid, thus necessitating a relatively long period of operation to accomplish the mixing of materials with the liquid.

In the present invention, the mixing operation is accomplished more efficiently, and more economically by substantially eliminating the possibility of materials floating upon the surface of the liquid as such materials are being introduced into the tank liquid.

At the opposite end of the tank 11, in a position adjacent wall 13, there is provided an upstanding tubular member 29, the upper end of which extends through the top wall 14 of the tank and is upwardly flared to provide a material receiving hopper 30. This hopper may be fitted with a transversely extending grill or bars 31 to prevent the entrance of foreign matter and break up the entering material.

The lowermost end of the tubular member 29 is deflected to provide a right-angled end portion 32 having its axis extending substantially parallel to the tank bottom. This end is associated with the driving shaft 24, the shaft being carried through a wall mounted bearing 33 and bearing 34 supported on the axis of the portion 32.

Between the bearings 33 and 34, there is provided an impeller 35 on the shaft 24, the blades of this impeller being so arranged that, when the shaft 24 is rotated in its normal direction for properly operating the pump 16, the impeller will act to suck liquid from the upper portion of the tank 11 immediately below the liquid surface 36 through one or more port openings 37.

From the foregoing, it will be apparent that liquid which is drawn into the tubular member 29 through the port openings 37 will be drawn into engagement with material which has been received into the tubular member 29 through the hopper 30, and that the inflow of liquid through port openings will prevent this material from moving outwardly through these port openings so that the material and liquid which are drawn in will be sucked toward the impeller 35. Moreover, since the material is within the tubular member 29, there is no possibility of its being spread over the liquid surface 36.

The liquid and the material, which are thus drawn toward the impeller 35, are further mixed by the action of the impeller and will be discharged in a jet or stream from the open end of the end portion 32 over the bottom of the tank so as to be mixed further with the tank liquid and subjected to the further mixing and agitating action of the impellers 27 and 28, where such impellers are utilized.

Although the invention has been described above with reference to a particular application, namely, as embodied in a mud mixer for utilization in the drilling of oil wells, it will be readily appreciated that the invention is susceptible of general use, and may be embodied in a mixer attachment for utilization with tanks and containers in general, where it is desired to introduce and mix materials with a tank or container liquid, particularly where the materials are of such nature that they would have a normal tendency to float on the surface of the liquid.

Specifically, in Fig. 2, I have disclosed an attachable unit which is self-contained and may be utilized with any tank or container as a mixing device.

Essentially, the tubular member 29 with its port openings 37 and arrangement of impeller 35 are the same as described in connection with the apparatus disclosed in Fig. 1, and similar parts have been identified by the same numerals in the two constructions. It will be noted, however, that instead of utilizing an exteriorly positioned power unit 23, and a driving shaft 24 passing through the tank in which the impeller 35 is positioned, a short shaft 24' is utilized, the end of the shaft 24' adjacent the bearing 33 being connected through a set of bevel gears 38 to a right angularly positioned shaft 39. This shaft is supported in suitable bearings 40—40 on the exterior of that portion of the tubular member 29 which extends above the end portion 32.

The uppermost end of the shaft 39 is connected to a suitable electric motor 41 mounted adjacent the hopper 30, so that, in a position of use of the mixer unit, the motor 41 will be disposed above surface of liquid in the tank or container with which the unit is associated.

Preferably, the shaft 39 and gearing 38 are protected in some manner from the liquid in the container with which the unit is used. This may be accomplished in various ways. In the illustrated construction, the parts are shown as being enclosed within a supplemental housing 42 which is connected along and supported on the right side of the tubular member 29, as shown in Fig. 2. By incorporating a packing gland with the bearing 33, the liquid will not enter the housing 42.

Various structural arrangements may be provided for removably attaching and supporting the mixer unit upon a wall 43 of a container or tank, as indicated in dotted line in Fig. 2. In the present instance, I have provided a bracket framework as generally indicated by the numeral 44. This framework includes a U-shaped part having spaced wall portions 45 and 46, which may be hooked over the upper edge margin of a container wall, such as the wall 43. By means of screw clamping members 47—47, the bracket may be secured to the wall 43, so as to removably support the mixer unit in a position of use. In the position of use, the port openings 37 will, of course, be submerged below the liquid surface in the same manner as described in connection with Fig. 1.

While I have in general described a particular construction which I have utilized in carrying out the present invention, it is contemplated that other constructions may be utilized without departing from the contemplated purpose and its broad concepts.

I claim:

1. Mixing apparatus, comprising: a tank for a fluid; an upright tubular member in said tank having an open ended portion extending above the fluid level in said tank for receiving material to be mixed with said fluid and a deflected substantially right-angled lower end portion positioned adjacent the tank bottom; fluid inlet ports in the wall of said member positioned in the upper portion of the fluid and adapted to be disposed adjacently below the fluid level thereof; an impeller mounted in said lower end portion of said tubular member for rotation in a direction to suck fluid through said inlet ports into the material in said tubular member and discharge the combined fluid and wetted material from the deflected lower end portion; and power means for actuating said impeller.

2. Mixing apparatus, comprising: a tank for a fluid; a member defining a tubular passage having a material charging inlet adapted to extend above the fluid level in said tank, and an outlet passage adapted to communicate with the bottom portion of the fluid in said tank; a fluid inlet passage for connecting the tubular passage with the top portion of said fluid below said fluid level; and means for drawing fluid through said inlet passage into the material and moving said fluid and mixed material through said tubular passage in a direction to discharge the fluid and wetted material through said outlet passage.

3. Mixing apparatus, comprising: a tank for fluid; means defining a first passage for circulation of fluid between bottom and top portions of the tank; first means for moving fluid through said passage; means defining a second passage for circulation of fluid between the top and bottom portions of the tank; second means for moving fluid through said second passage; common power means for actuating said first and second fluid moving means; and means for introducing materials into said second passage means.

4. A mixer unit attachment for a container for a liquid, comprising: an elongate tubular member having one end extending at an angle to its other end, said latter end defining a material charging opening and a port opening near said latter end; a rotatably mounted impeller adjacent said one end and supported on the tubular member; attaching means carried by the tubular member for removably supporting the unit in a position of use on the container with said one end, the impeller and said port submerged in liquid, and the other end with its charging opening above the liquid; a motor supported on the member adjacent said other end; and a power transmitting connection between said motor and said impeller.

5. A mixer unit attachment for a container for a liquid, comprising: an elongate tubular member having one end extending at an angle to its other end, said latter end defining a material charging opening and a port opening near said latter end; an impeller rotatably mounted on said member adjacent said one end; attaching means carried by the tubular member for removably supporting the unit in a position of use on the container with said one end, the impeller and said port submerged in liquid, and the other end above the liquid; a motor supported on the member adjacent said other end; a power transmitting connection between said motor and said impeller including a shaft mounted outside of said tubular member; and a supplemental wall member cooperating with said tubular member to house and seal said shaft with respect to the liquid in said container.

6. Mixing apparatus, comprising: a tank for fluid; means defining a first passage between the bottom and top portions of said tank, said means being substantially entirely outside of said tank; first means outside said tank for moving fluid through said passage; means defining a second passage between the top and bottom portions of said tank, said latter means being substantially entirely inside of said tank; second means within said tank for moving fluid through said second passage; common power means outside said tank for actuating said first and second fluid moving means; and means for introducing materials into said second passage means.

FELIX W. DREYFUS.

References Cited in the file of this patent

UNITED STATES PATENTS

| Number | Name | Date |
|---|---|---|
| 1,291,877 | Herrbold | Jan. 21, 1919 |
| 1,878,685 | Elkington | Sept. 20, 1932 |
| 1,933,346 | Schwentker | Oct. 31, 1933 |
| 1,992,261 | Traudt | Feb. 26, 1935 |
| 2,114,547 | Sollinger | Apr. 19, 1938 |
| 2,135,261 | Rosmait | Nov. 1, 1938 |
| 2,509,288 | Brochner | May 30, 1950 |